(12) United States Patent
Lee et al.

(10) Patent No.: US 11,384,819 B2
(45) Date of Patent: Jul. 12, 2022

(54) LINEAR MODULE

(71) Applicant: EWELLIX AB, Partille (SE)

(72) Inventors: Sungwon Lee, Gunpo-si (KR); Jinho Park, Gunpo-si (KR); Doosin Kong, Gunpo-si (KR)

(73) Assignee: Ewellix AB, Partille (SE)

( * ) Notice: Subject to any disclaimer, the term of this patent is extended or adjusted under 35 U.S.C. 154(b) by 127 days.

(21) Appl. No.: 16/461,124

(22) PCT Filed: Sep. 15, 2017

(86) PCT No.: PCT/KR2017/010145
§ 371 (c)(1),
(2) Date: May 15, 2019

(87) PCT Pub. No.: WO2019/035508
PCT Pub. Date: Feb. 21, 2019

(65) Prior Publication Data
US 2019/0360565 A1 Nov. 28, 2019

(30) Foreign Application Priority Data
Aug. 16, 2017 (KR) .................. 10-2017-0103550

(51) Int. Cl.
*F16H 25/20* (2006.01)
*F16H 25/22* (2006.01)
*F16H 25/24* (2006.01)

(52) U.S. Cl.
CPC .......... *F16H 25/20* (2013.01); *F16H 25/2003* (2013.01); *F16H 25/2204* (2013.01);
(Continued)

(58) Field of Classification Search
CPC .. F16H 25/20; F16H 25/2003; F16H 25/2204; F16H 25/2247; F16H 25/24;
(Continued)

(56) References Cited

U.S. PATENT DOCUMENTS 3,971,599 A * 7/1976 Shio .................. F16C 29/04
384/54
4,886,375 A * 12/1989 Tsukada ............. B23Q 11/0825
384/15
(Continued)

FOREIGN PATENT DOCUMENTS

EP 1972806 B1 7/2010
JP 2010-106934 A 5/2010
(Continued)

OTHER PUBLICATIONS

KIPO, Application No. 10-2017-0103550, Notice of Allowance, dated Jan. 19, 2019.
(Continued)

*Primary Examiner* — Zakaria Elahmadi
(74) *Attorney, Agent, or Firm* — Laurence A. Greenberg; Werner H. Stemer; Ralph E. Locher

(57) ABSTRACT

The present invention relates to a linear module. The linear module according to an example of the present invention comprises a base plate; a screw disposed on the base plate and arranged in the longitudinal direction of the base plate; a carrier block including a hollow part surrounding a portion of the screw; a carrier block rail disposed on one side of the carrier block and arranged in the longitudinal direction of the base plate; a long rail disposed on the base plate and arranged in the longitudinal direction of the base plate; and a roller guide disposed between the carrier block rail and the long rail and to reduce the frictional force between the carrier block rail and the long rail when the carrier block moves in the longitudinal direction of the base plate.

6 Claims, 5 Drawing Sheets

(52) U.S. Cl.
CPC ......... *F16H 25/2247* (2013.01); *F16H 25/24* (2013.01); *F16H 2025/204* (2013.01); *F16H 2025/2031* (2013.01)

(58) Field of Classification Search
CPC ....... F16H 2025/2031; F16H 2025/204; F16C 29/04; F16C 29/043; F16C 33/306; F16C 33/46; F16C 29/041
See application file for complete search history.

(56) References Cited

U.S. PATENT DOCUMENTS

| | | | | |
|---|---|---|---|---|
| 5,092,685 A * | 3/1992 | Tonogai | .............. | F16C 29/0607 384/15 |
| 5,097,716 A * | 3/1992 | Barbat | .................. | B23Q 1/267 248/657 |
| 5,102,235 A * | 4/1992 | Mugglestone | ...... | F16C 29/0609 384/43 |
| 5,195,391 A * | 3/1993 | Barbat | .................. | B23Q 1/267 248/657 |
| 5,427,454 A * | 6/1995 | Tsuboi | ................. | F16C 29/041 384/47 |
| 5,624,195 A * | 4/1997 | Abe | ...................... | F16C 29/063 384/15 |
| 5,711,611 A * | 1/1998 | Nagai | ..................... | B23Q 1/58 384/50 |
| 5,811,901 A * | 9/1998 | Nagai | ..................... | B23Q 1/58 310/80 |
| 6,132,093 A * | 10/2000 | Michioka | ............ | F16C 29/0607 384/45 |
| 7,210,849 B2 * | 5/2007 | Yamazaki | ............. | F16C 29/041 384/47 |
| 7,607,835 B2 * | 10/2009 | Keller | .................. | F16C 29/008 384/40 |
| 7,922,613 B2 * | 4/2011 | Iida | ......................... | F16H 19/06 474/140 |
| 8,573,847 B2 * | 11/2013 | Lee | ........................ | F16C 33/46 384/47 |
| 9,416,819 B2 * | 8/2016 | Taylor | ................... | F16C 29/084 |
| 9,784,311 B2 * | 10/2017 | Nara | ..................... | F16C 29/041 |
| 9,863,470 B2 * | 1/2018 | Tomita | ................. | F16C 29/0607 |
| 10,316,889 B2 * | 6/2019 | Nara | ..................... | F16C 33/4605 |
| 2001/0016087 A1 * | 8/2001 | Akiyama | ................ | F16C 29/06 384/17 |
| 2002/0164095 A1 * | 11/2002 | Nagai | ..................... | F16C 29/005 384/49 |
| 2003/0005785 A1 * | 1/2003 | Ung | ..................... | F16H 25/2418 74/89.4 |
| 2004/0093970 A1 * | 5/2004 | Iida | ..................... | F16C 33/3825 74/89.33 |
| 2004/0184683 A1 * | 9/2004 | Kuo | ..................... | F16C 29/063 384/7 |
| 2005/0029211 A1 * | 2/2005 | Mine | ..................... | F16C 29/005 211/183 |
| 2005/0109139 A1 * | 5/2005 | Nagai | ..................... | F16C 29/02 74/89.33 |
| 2006/0260425 A1 * | 11/2006 | Mizumura | ............ | F16C 29/082 74/89.32 |
| 2007/0201778 A1 * | 8/2007 | Kakei | .................... | F16C 33/543 384/51 |
| 2008/0190225 A1 * | 8/2008 | Pfister | ...................... | B23Q 5/40 74/89.23 |
| 2008/0245165 A1 * | 10/2008 | Wang | ...................... | F16H 25/20 74/89.36 |
| 2010/0139426 A1 * | 6/2010 | Mori | ..................... | F16C 29/088 74/89.32 |
| 2010/0206102 A1 * | 8/2010 | Aso | ....................... | F16C 29/082 74/89.4 |
| 2010/0206104 A1 * | 8/2010 | Pfister | ................. | F16C 33/6648 74/89.44 |
| 2011/0135224 A1 * | 6/2011 | Chen | ..................... | H05K 7/1489 384/26 |
| 2012/0073396 A1 * | 3/2012 | Kawaguchi | ......... | F16C 29/0642 74/424.82 |
| 2014/0150579 A1 * | 6/2014 | Li | ........................ | F16H 35/16 74/89.29 |
| 2015/0040701 A1 * | 2/2015 | Shimomura | ........ | F16H 25/2214 74/89.23 |
| 2015/0184730 A1 * | 7/2015 | Liu | ......................... | F16C 29/08 74/89.33 |
| 2015/0377330 A1 * | 12/2015 | Mori | ................... | F16H 25/2214 74/89.44 |
| 2016/0025198 A1 * | 1/2016 | Chen | ...................... | F16H 25/24 74/89.33 |
| 2017/0150816 A1 * | 6/2017 | Kathler | ................. | F16C 29/005 |

FOREIGN PATENT DOCUMENTS

| | | |
|---|---|---|
| JP | 2012-052651 A | 3/2012 |
| KR | 10-2009-0106857 A | 10/2009 |
| KR | 10-2010-0133357 A | 12/2010 |
| KR | 10-1583427 B1 | 1/2016 |

OTHER PUBLICATIONS

KIPO, Application No. 10-2017-0103550, Final Notice of Preliminary Rejection, dated Jan. 2, 2019.
KIPO, Application No. 10-2017-0103550, Notice of Preliminary Rejection, dated Jul. 17, 2018.

* cited by examiner

LINEAR MODULE

CROSS-REFERENCE TO RELATED APPLICATIONS

This application claims priority to PCT Application No. PCT/KR2017/010145 filed Sep. 15, 2017, entitled "Linear Module," which claims the benefit of and priority to Korean Patent Application No. 10-2017-0103550, filed on Aug. 16, 2017. All the aforementioned applications are incorporated by reference herein in their entirety.

BACKGROUND OF THE INVENTION

1. Field of the Invention

The present invention relates to a linear module.

2. Description of the Related Art

In general, an automation device is applied to a mass production facility. In the automation device, a linear module, which is a conventional linear reciprocating device for linear reciprocation of a product or equipment, is almost always applied.

Such a linear module has been applied to an automation device in various forms since the linear module makes it possible to lightly move the item to be transported while moving in a straight line, to make the positioning more accurately by stable driving force, and to maintain high accuracy for a long time. Major fields where such a linear module is applied are industrial robots and automatic control systems. Recently, it is widely used for postural control of a moving blade of an unmanned aerial vehicle, and a joint part of a multi-joint robot and an industrial automated instrument.

In the industrial field, the linear module repeats the same operation for several years and accordingly the deformation of the device and the positioning control error increase significantly over the accumulation of the use time and the operation distance.

SUMMARY OF THE INVENTION

It is an object of the present invention to provide a linear module with improved rigidity, acceleration performance, load coefficient and positioning control performance.

The linear module according to an example of the present invention comprises a base plate; a screw disposed on the base plate and arranged in the longitudinal direction of the base plate; a carrier block including a hollow part surrounding a portion of the screw; a carrier block rail disposed on one side of the carrier block and arranged in the longitudinal direction of the base plate; a long rail disposed on the base plate and arranged in the longitudinal direction of the base plate; and a roller guide disposed between the carrier block rail and the long rail and to reduce the frictional force between the carrier block rail and the long rail when the carrier block moves in the longitudinal direction of the base plate.

The roller guide can also include a first roller assembly rotating along one side of the carrier block rail groove and one side of the long rail groove, and a second roller assembly rotating along the other side of the carrier block rail groove and the other side of the long rail groove.

The roller guide can also include a supplemental material to prevent the carrier block rail or the long rail from sliding.

The supplemental material to prevent sliding above can also include at least one or more toothed wheels, and the carrier block rail or the long rail can comprise a groove corresponding to the teeth of the toothed wheel.

A side cover can also be equipped to cover at least a part of the carrier block and the base plate on the side.

A dust protective strip can also be equipped between the side cover and the carrier block and arranged in the longitudinal direction of the base plate to prevent foreign materials from coming into the base plate.

ADVANTAGEOUS EFFECT

The linear module according to an example of the present invention displays improved rigidity, acceleration performance, load coefficient and positioning control performance in addition to increased service life.

The linear module according to an example of the present invention can improve the operation performance of a linear module device in which fine positioning control and braking are important.

In addition, the linear module according to an example of the present invention can protect the parts necessary for the performance of a product from foreign materials by sealing effect and excellent rigidity compared to size.

DESCRIPTION OF THE PREFERRED EMBODIMENTS

Figure 1:
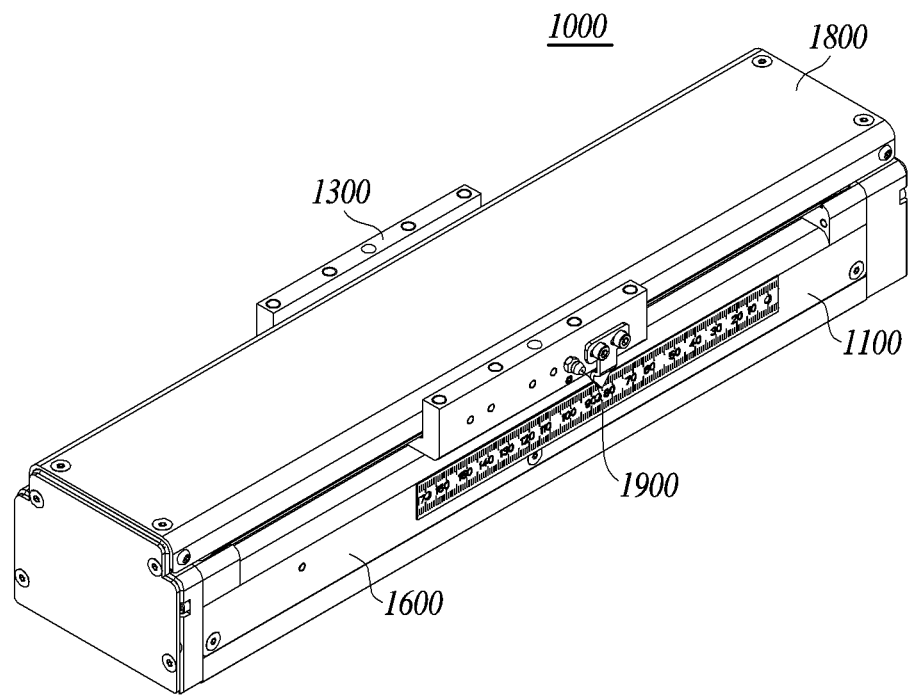
FIG. 1 illustrates the linear module according to an example of the present invention.

Hereinafter, the preferable embodiments of the present invention are described with the attached drawings. However, the embodiments of the present invention can be modified and altered in various ways and the present invention is not limited to the following illustration. It is well understood by those in the art who has the average knowledge on this field that the embodiments of the present invention are given to explain the present invention more precisely. Therefore, the shape and size of the elements in the drawings may be exaggerated for clarity of illustration and the elements indicated by the same mark in the drawings are the same elements. The factors showing similar function or activity are also indicated by the same mark in all the drawings. In addition, the inclusion of an element throughout the specification does not exclude other elements, but may include other elements, unless specifically stated otherwise.

FIG. 1 illustrates the linear module according to an example of the present invention.

Figure 2:
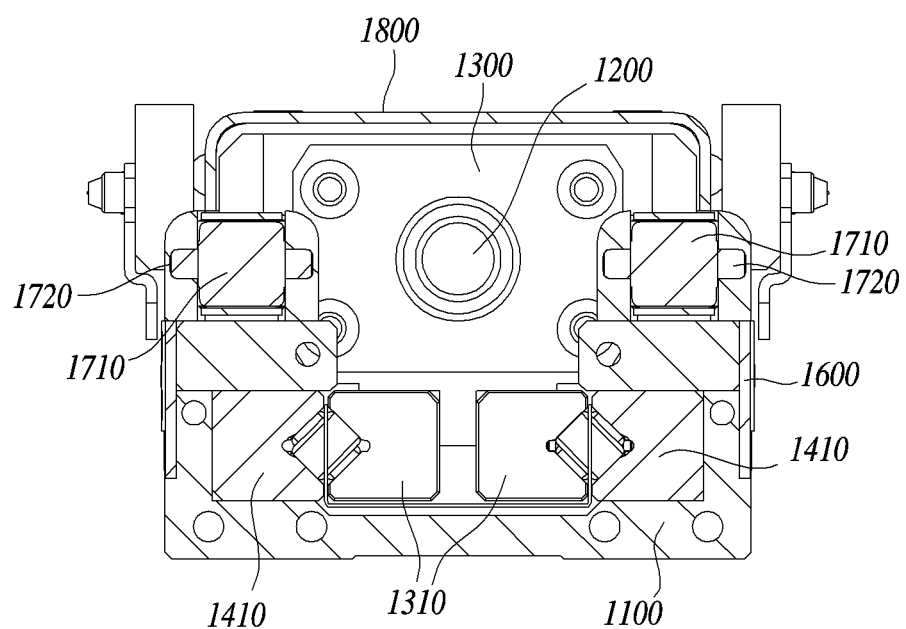
FIG. 2 illustrates the linear module according to an example of the present invention excluding the side cover and the upper cover.

FIG. 2 illustrates the linear module according to an example of the present invention excluding the side cover and the upper cover.

As shown in FIG. 1 and FIG. 2, the linear module according to an example of the present invention comprises a base plate (1100); a screw (1200) disposed on the base plate (1100) and arranged in the longitudinal direction of the base plate; a carrier block (1300) including a hollow part surrounding a portion of the screw; a carrier block rail (1310) disposed on one side of the carrier block (1300) and arranged in the longitudinal direction of the base plate; a long rail (1400) disposed on the base plate (1100) and arranged in the longitudinal direction of the base plate; and a roller guide (1500) disposed between the carrier block rail (1310) and the long rail (1400) and to reduce the frictional force between the carrier block rail and the long rail when the carrier block moves in the longitudinal direction of the base plate.

The base plate (1100) can be disposed on another mechanical device, a floor and a ceiling, and can define a straight line section in which the carrier block (1300) moves. The base plate can be made of iron/aluminum alloy, but not always limited thereto.

The linear module according to an example of the present invention can additionally include two end blocks fixed on both ends of the base plate (1100) which are separated from each other.

The screw (1200) can be disposed on the base plate (1100), arranged in the longitudinal direction of the base plate, and placed between the two end blocks.

The linear module according to an example of the present invention can additionally include a stopper in the inside of the two end blocks to protect the equipment from being damaged by collision of the carrier block and the end blocks. The stopper can be made of a polymer material with high impact durability for shock mitigation, but not always limited thereto.

One end and the other end of the screw (1200) can be disposed in contact with the inner side of the end block, and at least one end of the screw can be connected to a motor part that is an external device of the linear module to receive rotation power.

The screw can additionally include a break part at least at one end of the screw to control the motion of the linear module, and the break part can break the screw by frictional resistance.

The screw (1200) can contain screw threads and thread grooves, and can be connected to the hollow part of the carrier block (1300) corresponding to the threads and thread grooves. It is possible to drive the carrier block in the first direction and the second direction through the driving of the screw in the first rotation direction and the second rotation direction, or to move the carrier block forward and backward.

The hollow part of the carrier block (1300) can be connected to the screw by ball screw or lead screw manner, but not always limited thereto.

As shown in FIG. 2, the linear module according to an example of the present invention can additionally include a side cover (1600) disposed to cover at least a part of the side surface of the carrier block and the base plate.

The linear module according to an example of the present invention can additionally include an upper cover to cover the upper portion of the linear module including the other side of the carrier block.

Figure 3:
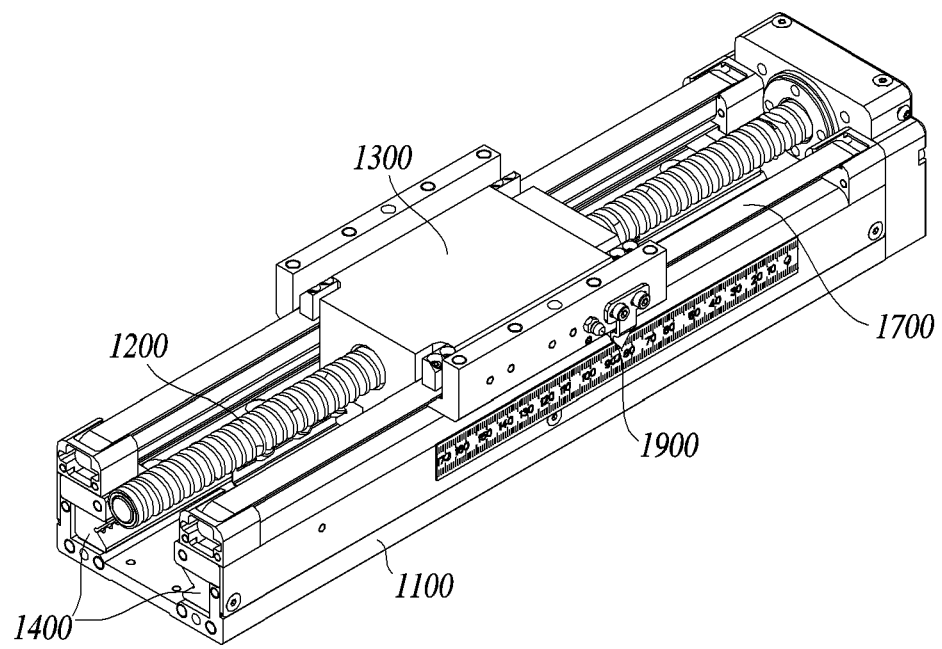
FIG. 3 illustrates the base plate, the long rail, the roller guide, the carrier block and the carrier block rail of the linear module according to an example of the present invention.

FIG. 3 illustrates the base plate (1100), the long rail (1400), the roller guide (1500), the carrier block (1300) and the carrier block rail (1310) of the linear module according to an example of the present invention.

As shown in FIG. 3, on one side of the carrier block (1300), a carrier block rail (1310), a long rail (1400), and a roller guide (1500) arranged in the longitudinal direction of the base plate (1100) can be placed.

On the other side of the carrier block (1300), other mechanical devices such as a welding device, a gripper and a handler, etc., can be placed. As the position of the carrier block is moved, the mechanical devices can be functioning at a desired location.

The carrier block (1300) can be made of an iron alloy comprising Cr, Mn, V and Fe, but not always limited thereto.

Figure 4:
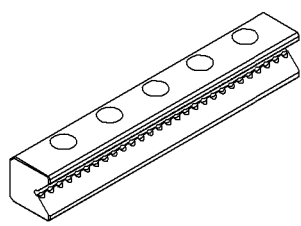
FIG. 4 is a sectional view illustrating the linear module.

FIG. 4 shows a carrier block rail.

As shown in FIG. 4, the carrier block rail (1310) can be a rod having a rectangular cross section. The carrier block rail can include a groove (1311) or a protrusion on one side of the carrier block rail in the longitudinal direction.

The carrier block rail (1310) can be made of an iron alloy comprising Cr, Mn, V and Fe, but not always limited thereto.

Figure 5:
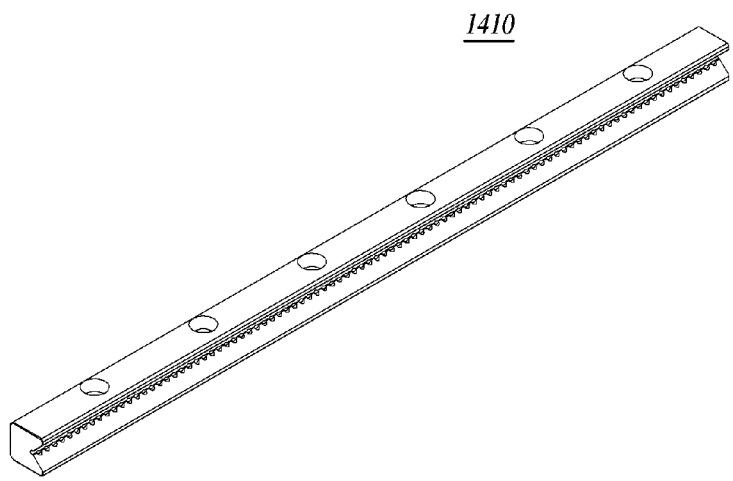
FIG. 5 illustrates the roller guide comprising the roller guide gauge, the first roller assembly, the second roller assembly and the toothed wheel.

FIG. 5 shows a long rail.

As shown in FIG. 5, the long rail (1400) can be disposed on the base plate (1100), and arranged in the longitudinal direction of the base plate. The long rail can be made of an iron alloy comprising Cr, Mn, V and Fe, but not always limited thereto.

The long rail (1400) can be a rod having a rectangular cross section. The long rail can include a groove (1311) or a protrusion on one side of the long rail in the longitudinal direction. The shape of the groove or the protrusion is not particularly limited.

The groove formed on one side of the long rail in the longitudinal direction of the long rail and the groove formed on one side of the carrier block rail in the longitudinal direction of the carrier block rail can have a structure corresponding to each other.

For example, if the protrusion formed on one side of the long rail has the shape of "M", the protrusion formed on the carrier block rail the shape of "V". If the groove formed on one side of the long rail has the shape of "V", the groove formed on one side of the carrier block rail has the shape of "V". The shape of the groove is not limited thereto.

If the long rail is one, the long rail can be disposed at the center of the base plate, and can include a protrusion or a groove in the shape of "M" or "V" on one side or on the other side of the long rail. The two carrier block rails disposed on both sides of the long rail can have a protrusion and a groove in the shape of "M" or corresponding thereto.

If the carrier block rail is one, the carrier block rail can be disposed at the center of one side of the carrier block, and can include a protrusion or a groove in the shape of "M" or "V" on one side or on the other side of the carrier block rail. The two long rails disposed on both sides of the carrier block rail can have a protrusion and a groove in the shape of "M" or "V" corresponding thereto.

Figure 6:
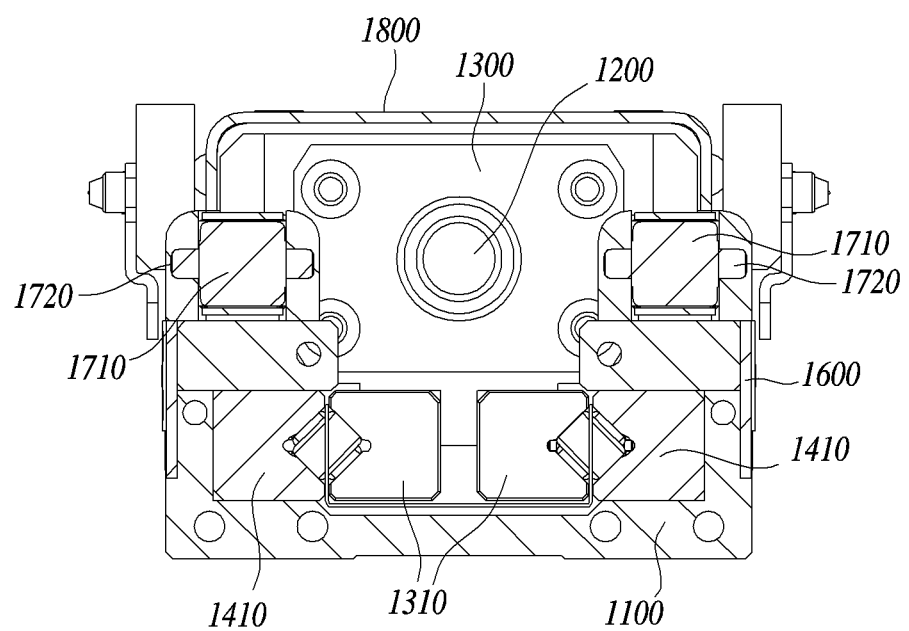
FIG. 6 illustrates the sections of the long rail, the carrier block rail and the roller guide.

FIG. 6 is a sectional view of the linear module according to an example of the present invention.

As shown in FIG. 6, the linear module according to an example of the present invention can contain a pair of long rails including "V" shaped grooves and a pair of carrier block rails including "V" shaped grooves corresponding thereto disposed on the base plate.

If the carrier block rail and the long rail are in direct contact with each other, problems may occur due to abrasion and heat generated during operation caused by high frictional force, and the service life can be reduced. A roller guide (1500) capable of lowering the frictional force between the carrier block rail and the long rail when the carrier block moves in the longitudinal direction of the base plate can be included.

The roller guide (1500) can include a roller that rotates along one side of the carrier block rail and a roller that rotates along one side of the long rail.

The roller can be in the shape of a cylinder, a ball or a needle, but not always limited thereto.

The shape of the roller is preferably a ball or a cylinder which favors the intersection of the surfaces contacting the carrier block rail and the long rail.

The roller can be made of an iron alloy comprising chromium and iron, but not always limited thereto. The roller can further include a surface coating layer for regulating the frictional force coefficient.

Figure 7:
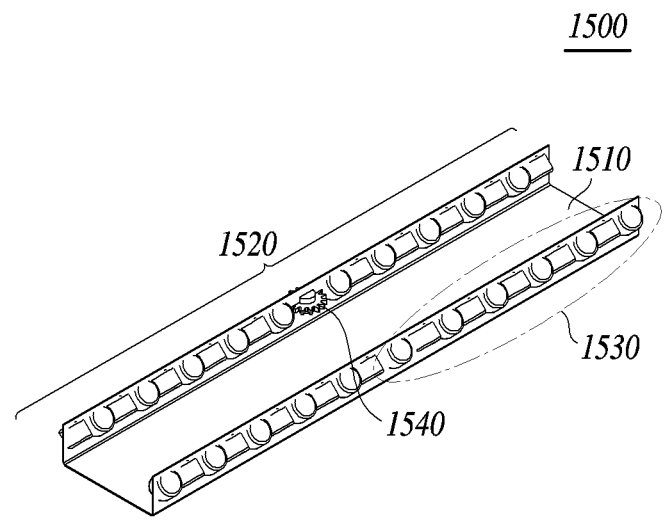
FIG. 7 illustrates the long rail.
Figure 8:
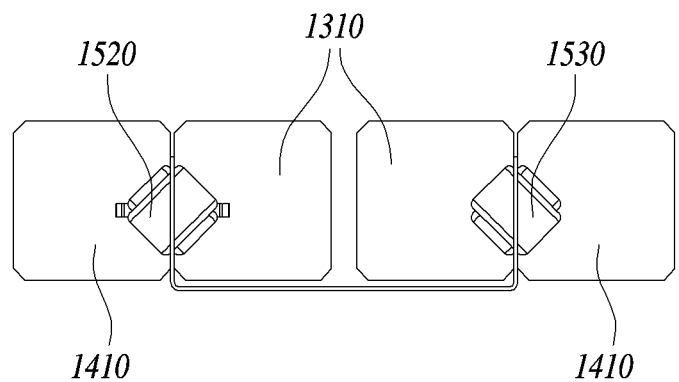
FIG. 8 illustrates the carrier block rail.

FIG. 7 shows a roller guide comprising a roller guide cage, a first roller assembly, a second roller assembly and a toothed wheel.

As shown in FIG. 7, the roller guide (1500) can include a first roller assembly (1520) rotating along one side of the carrier block rail groove and one side of the long rail groove and a second roller assembly (1530) rotating along the other side of the carrier block rail groove and the other side of the long rail groove.

The roller guide (1500) can be disposed in the grooves of the long rail (1400) and the carrier block rail (1310) mentioned above. At this time, in order to arrange the roller guide between the carrier block rail and the long rail, each of the carrier block rail and the long rail has a groove for disposing a part of the roller guide, and the roller guide (1500) can be disposed in the grooves.

The roller guide cage (1510) can have such a skeletal structure capable of accommodating the roller.

The roller guide cage (1510) can be made of a plastic including POM or PA 12 or an aluminum alloy, but not always limited thereto.

The roller guide (1500) can regulate the frictional force between the carrier block rail (1310) and the long rail (1400) when the linear module is running, and thereby the movement of the carrier block to a target location can be accelerated in the linear module due to the reduced frictional force.

The roller guide (1500) according to an example of the present invention can be arranged such that the orientation of the roll plane is different from that of the adjacent roller. That is, the roller guide can include a first roller assembly (1520) and a second roller assembly (1530) in which the surfaces contacting the carrier block rail and the long rail are interchanged.

For example, if the roller guide cage (1510) can accommodate 10 rollers, the number of the first roller assemblies may be 5, and the number of the second roller assemblies may be 5. Or, the number of the first roller assemblies may be 4, and the number of the second roller assemblies may be 4. Or, the number of the first roller assemblies may be 7, and the number of the second roller assemblies may be 3. The first roller assembly and the second roller assembly can be arranged in the mirror symmetry or point symmetry with respect to the central cross section of the roller guide. However, the arrangement of the first roller assembly and the second roller assembly can vary depending on the environment in which the roller guide is used.

The number of the first roller assembly (1520) and the second roller assembly (1530) can vary from the size of the roller guide.

The roller guide (1500) can additionally include a supplemental material (1540) preventing the roller guide from slipping along the carrier block rail or the long rail.

The supplemental material (1540) preventing slipping can be in the shape of a toothed wheel. The carrier block rail or the long rail can have grooves corresponding to each tooth of the toothed wheel.

The supplemental material preventing slipping can be made of brass, but not always limited thereto.

By including the supplemental material preventing slipping, the deformation of the roller guide caused by the accumulation of the driving distance can be reduced. Also, the positioning using a toothed wheel not by a sliding type drive can more accurate and can reduce jamming resulted from rolling motion between parts and can reduce abrasion caused by friction, indicating the service life of parts can be extended.

The supplemental material (1540) preventing slipping is functioning to distribute the load applied to the roller guide and to fix the carrier block without fine movement. Therefore, precise positioning control can be performed during operation of the robot arm, the grip handler, and the welding device fixed on the carrier block, indicating that the operation performance of the linear module device requiring precise positioning control and braking can be improved.

The supplemental material (1540) preventing slipping can be disposed one or two on the roller guide of the linear module according to an example of the present invention.

The supplemental material (1540) preventing slipping can be disposed on at least one of the two roller guides.

For example, the linear module according to an example of the present invention comprises the first roller guide and the second roller guide, wherein only the first roller guide can include the toothed wheel. At this time, one or two toothed wheels can be disposed on the first roller guide and cannot be disposed on the second roller guide.

The supplemental material (1540) preventing slipping can be arranged at a center or a longitudinal direction of the roller guide. A plurality of the supplemental materials preventing slipping can be further arranged to be symmetrical to one axis.

As shown in FIG. 4 and FIG. 5, the grooves corresponding to the supplemental material (1540) preventing slipping can be formed on the carrier block rail or the long rail. When the linear module is not driven, the teeth of the supplemental material (1540) preventing slipping can be fastened to the carrier block rail groove (1311) and the long rail groove (1410). When the toothed wheel is engaged with the grooves corresponding to the teeth, the teeth can be out of the grooves by applying a force exceeding a certain level of torque. Therefore, the linear module according to an example of the present invention can be prevented from slipping by the toothed wheel and the corresponding grooves. The teeth of the supplemental material (1540) preventing slipping can be fixed in such a manner that they are fastened to the corresponding grooves of the long rail and the carrier block rail. When the linear module is driven, the toothed wheel can move from the fixed groove to the other groove. When the toothed wheel moves from the groove to the other groove, a certain level of torque is required. So, the vibration of the device can be suppressed when the linear module is stopped.

As shown in FIG. 2, a dust protective strip (1700) disposed between the side cover and the carrier block and arranged in the longitudinal direction of the base plate to block foreign substances from entering into the base plate from the outside. The dust protective strip (1700) can be disposed in the manner of sliding contact with the carrier block and the side cover. The dust protective strip can cover any gap of a certain part that is unavoidably exposed during operation of the linear module in order to prevent malfunctioning of the module caused by any foreign substance invaded in the linear module.

Figure 9:
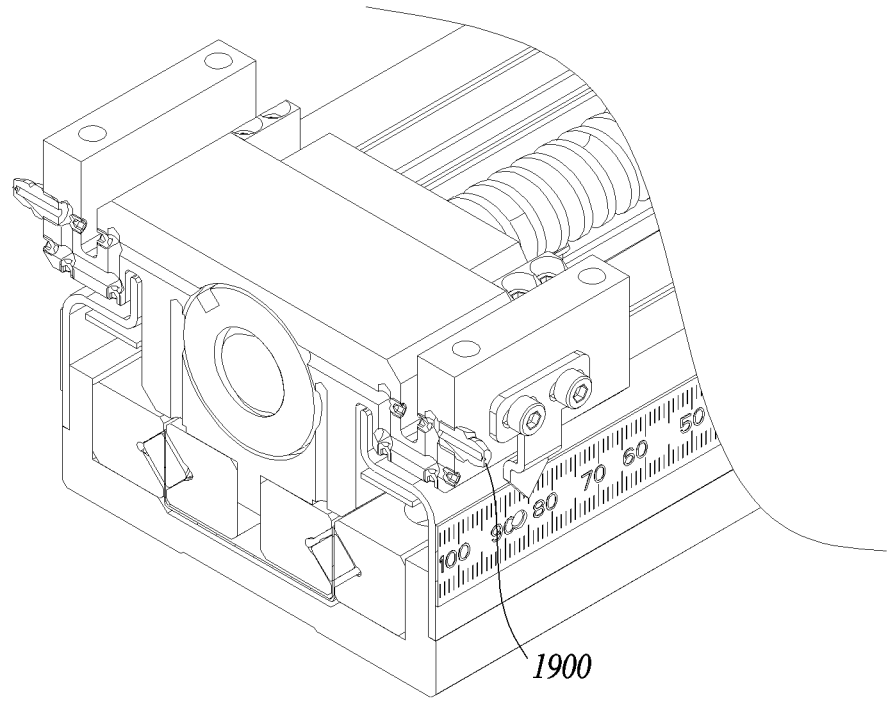
FIG. 9 illustrates the sections of the oil port and the channel of the linear module according to an example of the present invention.

FIG. 9 shows the oil port and the channel of the linear module according to an example of the present invention.

As shown in FIG. 9, the linear module according to an example of the present invention can additionally include a lubricant injection device (1900) for the lubrication of the parts of the linear module. The lubricant injection device (1900) can be disposed on one side of the carrier block (1300) and the lubricant injected by the lubricant injection device can contain LGEP 2 or LGMT 2, but not always limited thereto.

The cycle of the lubrication is every 5000 km after the first injection of the lubricant.

Figure 10:
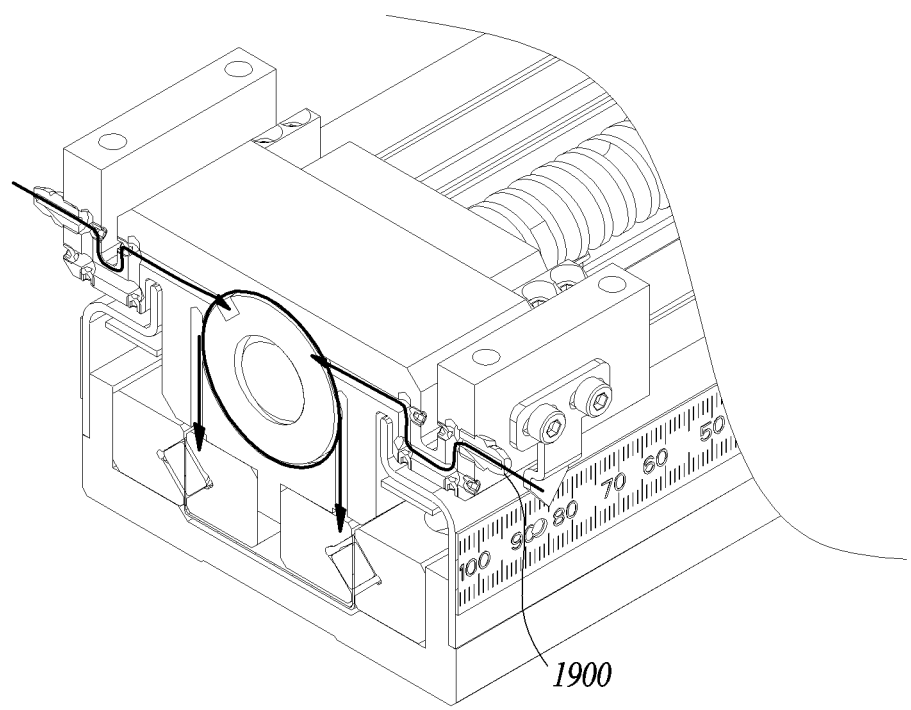
FIG. 10 illustrates the lubricant introduction pathway of the oil port and the channel of the linear module according to an example of the present invention.

FIG. 10 shows the lubricant introduction pathway of the oil port and the channel of the linear module according to an example of the present invention.

As shown in FIG. 10, the lubricant can be injected through the oil port and the channel of the linear module along the arrow and thereafter it can flow along the edge of the supplemental material covering the screw.

The present invention is not limited to the examples embodiments described above and the accompanying drawings but is defined by the appended claims. So, it will be understood that various substitutions, modifications and alterations can be made by those skilled in the art without departing from the spirit and scope of the present invention as defined by the appended claims. And they are also within the scope of the present invention.

INDUSTRIAL APPLICABILITY

The present invention can be used as a linear module with improved rigidity, acceleration performance, load coefficient and positioning control performance.

What is claimed is:

1. A linear module comprising:
a base plate;
a screw disposed on the base plate and arranged in the longitudinal direction of the base plate;
a carrier block including a hollow part surrounding a portion of the screw;
a pair of carrier block rails disposed on one side of the carrier block and arranged in the longitudinal direction of the base plate and having a carrier block rail groove;
a pair of long rails disposed on the base plate and arranged in the longitudinal direction of the base plate and having a long rail groove; and
a roller guide disposed in the carrier block rail groove and the long rail groove and between the carrier block rail and configured to reduce frictional force between the carrier block rail and the long rail when the carrier block moves in the longitudinal direction of the base plate,
wherein the roller guide comprises:
a roller guide cage comprising a bottom surface and a pair of side wall surfaces facing each other and disposed perpendicular to the bottom surface;
a first roller assembly transitionally fixed relative to said guide cage at a first of the pair of sidewall surfaces of the roller guide cage and rotating along a first side of the carrier block rail groove and a first side of the long rail groove; and
a second roller assembly transitionally fixed relative to said guide cage at a second of the pair of sidewall surfaces of the roller guide cage and rotating along a second side of the carrier block rail groove and a second side of the long rail groove,
wherein the roller guide includes a supplemental material to prevent slipping of the roller guide along the carrier block rail or the long rail.

2. The linear module according to claim 1, wherein the roller guide includes a roller rotating along one side of the carrier block rail and a roller rotating along one side of the long rail.

3. The linear module according to claim 1, wherein the roller is in the shape of a cylinder, a ball or needle.

4. The linear module according to claim 1, wherein the supplemental material to prevent slipping of the roller guide includes at least one of toothed wheels and the carrier block rail or the long rail includes the grooves corresponding to the teeth of the toothed wheel.

5. The linear module according to claim 1, wherein the linear module additionally includes a side cover to cover at least a part of the carrier block and the base plate on the side.

6. The linear module according to claim 5, wherein the linear module additionally includes a dust protective strip disposed between the side cover and the carrier block and arranged in the longitudinal direction of the base plate to prevent foreign materials from coming into the base plate.

* * * * *